Jan. 24, 1950     C. L. SMITH     2,495,350
AUTOMOBILE REFRIGERATOR
Filed June 28, 1946     2 Sheets-Sheet 2
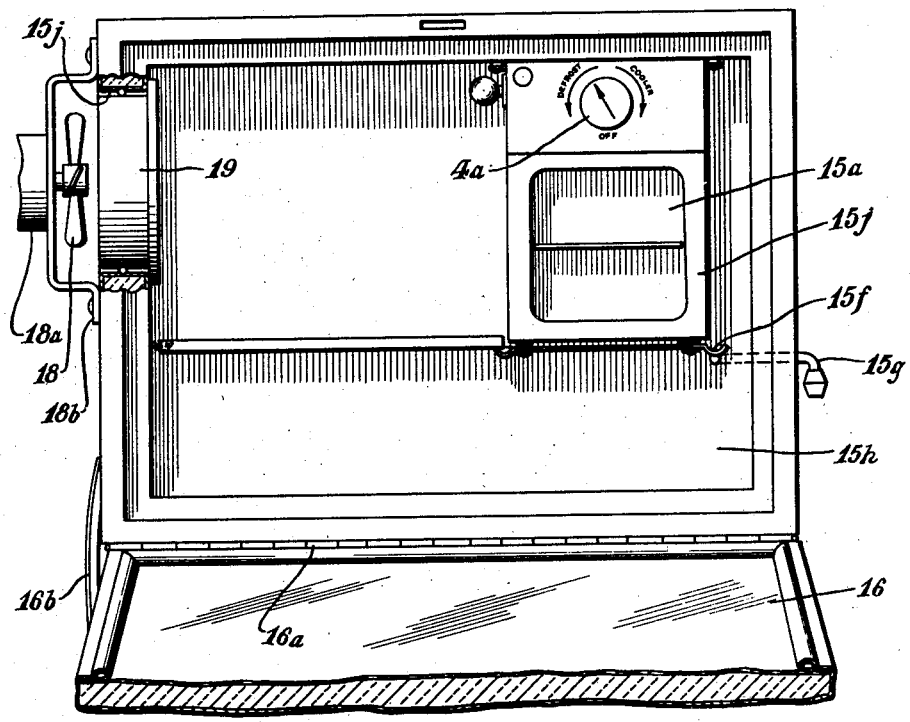
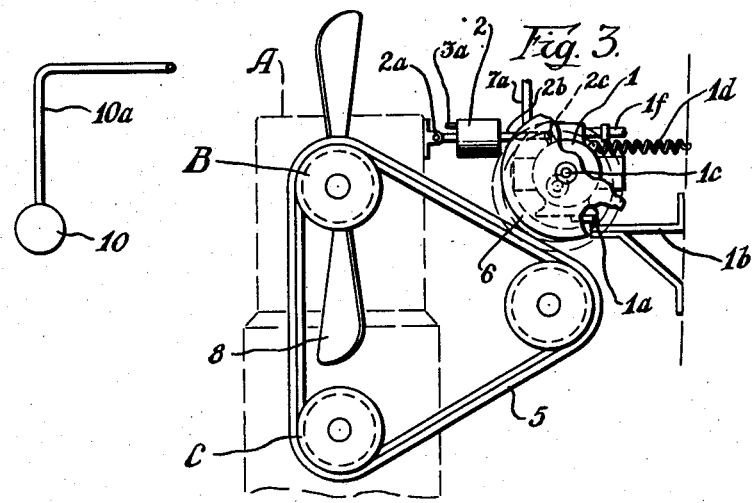
INVENTOR.
Charles L. Smith,
BY A. B. Bowman
Attorney.

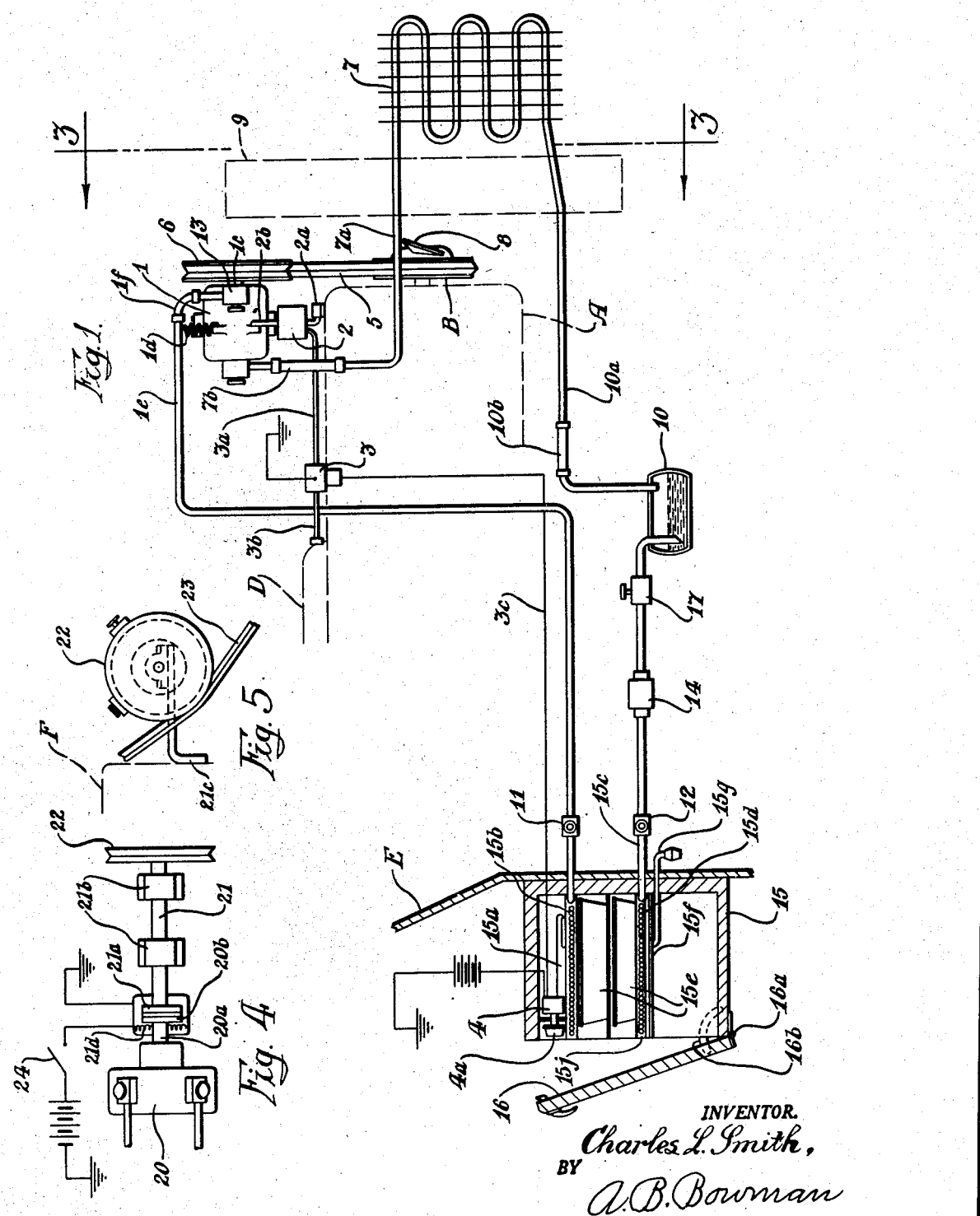

Patented Jan. 24, 1950

2,495,350

UNITED STATES PATENT OFFICE 2,495,350

AUTOMOBILE REFRIGERATOR

Charles L. Smith, San Diego, Calif.

Application June 28, 1946, Serial No. 680,182

2 Claims. (Cl. 62—4)

My invention relates to an automobile refrigerator, more particularly for use in the passengers compartment of an automobile or other similar vehicle for refrigerating foods and beverages and for cooling the interior of the automobile body during hot weather and the objects of my invention are:

First, to provide an automobile refrigerator of this class in which proper cycling and temperature control thereof is entirely automatic;

Second, to provide an automobile refrigerator of this class in which the conventional refrigeration compressor is intermittently, automatically engaged with the operating mechanism of the automobile by means of a thermostatically controlled switch in the freezing compartment of said refrigerator;

Third, to provide an automobile refrigerator of this class which is very easy and convenient to install in connection with conventional automobiles;

Fourth, to provide an automobile refrigerator of this class which freezes ice cubes in a minimum length of time;

Fifth, to provide an automobile refrigerator of this class which provides refrigerated storage for fish and game which must be transported a considerable distance after having been taken;

Sixth, to provide an automobile refrigerator of this class in which the automobile fan operates as a cooling air circulator for the condenser of the refrigerator unit; and Seventh, to provide an automobile refrigerator of this class which is very simple and economical of construction, efficient in operation and which will not readily deteriorate or get out of order.

With these and other objects in view as will appear hereinafter, my invention consists of certain novel features of construction, combination and arrangement of parts and portions, and a certain modification, as will be hereinafter described in detail and particularly set forth in the appended claims, reference being had to the accompanying drawings and to the characters of reference thereon forming a part of this application, in which:

Fig. 1 is a diagrammatic view of my automobile refrigerator shown in the connection with the engine and fire wall of a conventional automobile; Fig. 2 is an enlarged view of the freezing compartment of my automobile refrigerator showing the freezing cabinet door in open position and showing portions thereof broken away and in section to amplify the illustration; Fig. 3 is an end view of an automobile engine taken from the line 3—3 of Fig. 1 showing the relative position of the compressor of my automobile refrigerator to the fan belt of said engine; Fig. 4 is a diagrammatic view of a modification of the compressor engaging means of my automobile refrigerator; and Fig. 5 is an end view of the structure shown in Fig. 4 illustrating the automobile fan belt in engagement therewith.

Similar characters of reference refer to similar parts and portions throughout the several views of the drawing.

The compressor 1, vacuum cylinder 2, solenoid valve 3, thermostatic switch 4, fan belt 5, pulley 6, condenser 7, automobile fan 8, automobile radiator 9, condenser reservoir 10, valves 11, 12 and 13, dryer 14, freezing cabinet 15, freezing cabinet door 16, service valve 17, refrigerating fan 18, and the cabinet fan opening plug 19 constitute the principal parts and portions of my automobile refrigerator.

The compressor 1 of my automobile refrigerator, pivotally mounted on a pin 1a, supported by a bracket 1b, is stationarily mounted relatively to the engine A, of the automobile. Secured to the operating shaft 1c of the compressor 1 is the pulley 6. This pulley 6 is arranged to engage the fan belt 5 which passes over the automobile engine fan belt pulley B and the crankshaft pulley C, all as shown best in Fig. 3 of the drawing. Connected with the compressor 1 is a tension spring 1d tending to hold the compressor 1 away from the fan belt 5, maintaining disengagement of the pulley 6 therefrom. The vacuum cylinder 2 is pivotally mounted by a pin 2a to the block of the automobile engine A and this vacuum cylinder 2 is provided with a reciprocally mounted plunger 2b pivotally connected by a pin 2c at its outer end to the compressor 1. As shown in the diagrammatic view, Fig. 1 of the drawings, the solenoid valve 3 interconnects vacuum tubes 3a and 3b which are arranged to conduct air from the vacuum cylinder 2 to the conventional automobile intake manifold, all as shown best in Fig. 1 of the drawings. It will be noted that the tube 3b is connected to the automobile intake manifold D at its one end and to the solenoid valve 3 at its opposite end. The tube 3a is connected to the solenoid valve 3 at one end and communicates with the interior of the vacuum cylinder 2 at its opposite end. The solenoid valve 3 is electrically connected with the thermostatic switch 4 by means of the electrical conductor 3c, as shown in Fig. 1 of the drawings. The thermostatic switch 4 is positioned adjacent the freezing tubes in the freezing compartment 15a of the freezing cabinet 15. This thermostatic switch 4 is a conventional control switch used in refrigerators and includes a rheostat for controlling various degrees of temperature at which the solenoid valve 3 is actuated. The manual operating knob 4a of the thermostatic switch 4, as shown in Figs. 1 and 2 of the drawings, permits selection of the operating temperature of my automobile refrigerator. It will be here noted that the compressor 1 is a conventional refrigerator compressor and is connected with the tubular conductor 1e, in communicative relation with the freezing coils 15b, in the freezing compartment 15a of the freezing cabinet 15, all as shown best in Fig. 1 of the drawings. In connection with the tubular conductor 1e is a conventional service valve 11. Communicating with the opposite end 15d of the freezing coils 15b is a conductor 15c communicating with the expansion valve 12, dryer 14, service valve 17 and the condenser reservoir 10. Communicating with the condenser reservoir 10 in the conventional manner is a tubular conductor 10a which communicates with the tubular finned condenser 7. The opposite end of this tubular finned condenser 7 is connected in communicative relation with the compressor 1 in the conventional manner by the conductor tube 7a. Flexible tubular couplings 10b and 7b relieve vibrational strain in the tubular conductors 10a and 7a respectively. The tubular conductor 1e communicating with the compressor 1 is also provided with a resilient tubular connection 1f adapted to relieve vibrational strain in the tubular conductor 1e. It will be here noted that the fan 8 of the automobile engine A provides circulation of air around the condenser 7 which is preferably placed forwardly of the automobile engine radiator 9, as shown by dash lines in Fig. 1 of the drawings. Normal operating temperature of an automobile engine approaches approximately 160° Fahrenheit and therefore the air stream forwardly of the radiator 9 is substantially cooler. Thus, the condenser 7 is placed forwardly of the radiator 9 for more efficient operation. The freezing cabinet 15, as shown in Fig. 1 of the drawings, is preferably connected to the fire wall E of the automobile at the inner side thereof in the operator's compartment. However, this freezing cabinet may be placed in other locations in the automobile body if desired. The freezing compartment of the freezing cabinet 15 supports ice trays 15e. Positioned below the freezing compartment 15a is a drain tray 15f, having an externally positioned drain tube 15g provided with a conventional flutter valve for draining away moisture during defrosting operations of the freezing unit. It will be here noted that the drain tube 15g extends outwardly of the automobile operator's compartment forward of the firewall E so that the drainage from defrosting of the freezing coils in the freezing compartment 15a is drained outwardly and downwardly onto the ground below the automobile. The freezing cabinet 15 is provided with considerable storage space 15h around the freezing compartment 15a, communicating with which is the cabinet fan opening plug 19, fitted in an opening 15j in the side of the freezing cabinet 15, as shown best in Fig. 2 of the drawings. Communicating with the opening 15j is the fan 18, having a motor 18a mounted on brackets 18b, secured to the outer side of the freezing cabinet 15, all is shown best in Fig. 2 of the drawings. The freezing cabinet door 16 is connected to the normally front side of the freezing cabinet by means of an extending hinge 16a. In connection with the freezing cabinet door 16 is a stop member 16b arranged to limit the pivotal movement of the door 16 about the axis of the hinge 16a.

The operation of my automobile refrigerator is substantially as follows:

When the control knob 4a of the thermostatic switch 4 is set at the cooler position, as shown in Fig. 2 of the drawings, and the automobile to which my automobile refrigerator is attached is running, high temperature in the freezing compartment 15a causes the contacts of the conventional thermostatic switch 4 to close, energizing the solenoid 3 and opening the passage of air therethrough permitting the automobile intake manifold D to exhaust the vacuum cylinder 2 through the tubular conductors 3a and 3b. When the air is exhausted from the vacuum cylinder 2, the plunger 2b is retracted therein moving the compressor 1 on its pivotal mounting pin 1a, engaging the pulley 6 with the belt 5, causing rotary operation of the compressor shaft 1c. During operation of the compressor 1, the condenser 7, together with the condenser reservoir 10, freezing tubes 15b, and communicating equipment operate as a conventional compressor-type refrigerator reducing temperature in the freezing compartment 15a of the freezing cabinet 15. When temperature of the freezing compartment 15a is lowered to a predetermined temperature according to the setting of the control knob 4a, the thermostatic switch 4 opens de-energizing the solenoid valve 3 and permitting the same to close communication of the conductor tubes 3a and 3b whereupon the vacuum cylinder 2 gradually fills with air when the plunger 2c therein is extended by tension of the spring 1d. As the spring 1d retracts the compressor 1, pivoting the same on the pivotal mounting pin 1a, the pulley 6 is released from belt 5 discontinuing operation of the compressor until temperature in the freezing compartment 15a again rises to a predetermined degree of temperature. It will be noted that the condenser 7 is placed forwardly of the automobile engine radiator 9 and the air draft created by the automobile engine fan 8 serves as an air circulating means for cooling said condenser 7.

In the modification, as shown in Figs. 4 and 5 of the drawing, the compressor 20 is substantially the same in construction as the compressor 1 shown in Fig. 1 of the drawings. This compressor 20 communicates with similar equipment to that shown in connection with the compressor 1 disclosed in Fig. 1 of the drawings. The extending shaft 20a of the compressor 20 is provided with an electrical clutch plate 20b operatively associated with a clutch plate 21a of the drive shaft 21 on which the pulley 22 is secured. This pulley 22 is constantly engaged with the fan belt 23 which is similar in construction to the fan belt 5 shown in Fig. 1 of the drawings. The magnetic clutch plates 20b and the clutch plate 21a form a magnetic coupling which is electrically connected with a thermostatic switch 24 similar to the thermostatic switch 4 disclosed in Fig. 1 of the drawings. It will be noted that the compressor 20 and the bearings 21b are stationarily mounted during constant operation of the pulley 22 in connection with the fan belt 23. The bearings 21b and the compressor 20 may be mounted in connection with the automobile engine block F by means of brackets 21c.

The operation of the modified structure shown in Figs. 4 and 5 of the drawings is substantially as follows:

The thermostatic switch 24, similar to the thermostatic switch 4, as shown in Fig. 1 of the drawings, is positioned in the refrigerator freezing compartment and is closed when the temperature in the freezing compartment rises to a predetermined degree. When the thermostatic switch 24 is closed by a rise in temperature in the freezing compartment, the magnetic clutch, consisting of the clutch plates 20b and 21a, together with the winding 21d, engages the shaft 21 with the shaft 20a of the compressor 20, starting operation of the compressor 20, it being noted that the shaft 21 is constantly revolved by the pulley 22 in constant engagement with the fan belt 23. As the temperature in the freezing compartment goes down to a predetermined degree, the thermostatic switch 24 is opened and the magnetic clutch releases the shaft 21 from the shaft 20a of the compressor 20 stopping operation of the compressor 20 until the switch 24 is again closed.

It will be here noted that the brine tank 15j is arranged to provide cold holdover and this brine tank 15j is common to both the principal and modified structure hereinbefore disclosed.

Though I have shown and described a particular construction, combination and arrangement of parts and portions, and a certain modification, I do not wish to be limited to the particular construction, combination and arrangement nor to the modification, but desire to include in the scope of my invention, the construction, combination and arrangement substantially as set forth in the appended claims.

Having thus described my invention, what I claim as new and desire to secure by Letters Patent is:

1. In a refrigerator for automobiles, the combination with operating mechanism of an automobile, of a compressor engageable with and disengageable from said operating mechanism for rotative operation of said compressor, a freezing compartment, a thermostatic switch in said freezing compartment, means electrically associated with said thermostatic switch for engaging and disengaging said compressor from the operating mechanism of said automobile when temperature varies in said freezing compartment actuating said thermostatic switch, said means including a solenoid valve, and a vacuum cylinder communicating through said solenoid valve with the intake manifold of the operating mechanism of said automobile.

2. In a refrigerator for automobiles, the combination with operating mechanism of an automobile, of a compressor engageable with and disengageable from said operating mechanism for rotative operation of said compressor, a freezing compartment, a thermostatic switch in said freezing compartment, means electrically associated with said thermostatic switch for engaging and disengaging said compressor from the operating mechanism of said automobile when temperature varies in said freezing compartment actuating said thermostatic switch, said means including a solenoid valve, and a vacuum cylinder communicating through said solenoid valve with the intake manifold of the operating mechanism of said automobile, said compressor pivotally mounted relatively to said vacuum cylinder and having a pulley on the operating shaft thereof, said operating mechanism of said automobile including a fan belt, engageable with said pulley, said vacuum cylinder having a plunger therein adapted to pivotally operate said compressor carrying said pulley into and out of engagement with said fan belt.

CHARLES L. SMITH.

REFERENCES CITED

The following references are of record in the file of this patent:

UNITED STATES PATENTS

| Number | Name | Date |
| --- | --- | --- |
| 1,943,965 | Hulse | Jan. 16, 1934 |
| 2,169,664 | Shifflett | Aug. 15, 1939 |
| 2,227,927 | Downs | Jan. 7, 1941 |
| 2,250,386 | Maniscalco | July 22, 1941 |
| 2,272,302 | Krackowizer | Feb. 10, 1942 |
| 2,336,733 | Hull | Dec. 14, 1943 |